(12) United States Patent
Shultz et al.

(10) Patent No.: US 7,743,041 B2
(45) Date of Patent: Jun. 22, 2010

(54) DATA ORIENTED NAVIGATION WITHIN SOFTWARE APPLICATIONS

(75) Inventors: John Thomas Shultz, Savage, MN (US); Richard D. Patton, Hastings, MN (US)

(73) Assignee: Lawson Software, Inc., St. Paul, MN (US)

( * ) Notice: Subject to any disclaimer, the term of this patent is extended or adjusted under 35 U.S.C. 154(b) by 398 days.

(21) Appl. No.: 11/400,054

(22) Filed: Apr. 7, 2006

(65) Prior Publication Data

US 2007/0239775 A1 Oct. 11, 2007

(51) Int. Cl.
*G06F 17/30* (2006.01)
*G06F 17/00* (2006.01)

(52) U.S. Cl. ...................................... 707/705
(58) Field of Classification Search ........................ None
See application file for complete search history.

(56) References Cited

U.S. PATENT DOCUMENTS 7,043,481 B2 * 5/2006 Mullins et al. ................ 707/10
7,065,714 B1 * 6/2006 Theel et al. .................. 715/781
7,131,069 B1 * 10/2006 Rush et al. ................... 715/738
2004/0051740 A1 * 3/2004 Reichel et al. ............... 345/789
2004/0250258 A1 * 12/2004 Raghuvir et al. ............. 719/315
2005/0114361 A1 * 5/2005 Roberts et al. ............... 707/100
2006/0095466 A1 * 5/2006 Stevens et al. ........... 707/103 R
2006/0235838 A1 * 10/2006 Shan et al. ..................... 707/4
2007/0038995 A1 * 2/2007 Boyle et al. .................. 717/177

* cited by examiner

*Primary Examiner*—Yicun Wu
(74) *Attorney, Agent, or Firm*—Schwegman, Lundberg & Woessner, P.A.

(57) ABSTRACT

Various embodiments as described and illustrated herein provide data oriented navigation within software applications. Some such embodiments include navigations within objects that make the navigations available to other objects. Objects in such embodiments include a representation of a software application data model to determine an object that is responsible for maintaining data. Thus, when an object receives a navigation request based on an item of data, the object receiving the request determines which object is responsible for maintaining the item of data and routes the navigation request to the appropriate object. That object then provides a list of available navigations that are displayed for selection within a user interface.

18 Claims, 7 Drawing Sheets

FIG. 2A
← 200

| EMPLOYEE DETAIL | |
|---|---|
| EMPLOYEE NAME | JOHN Q. SMITH — 202 |
| EMPLOYEE DEPARTMENT | ACCOUNTING — 204 |
| EMPLOYEE TITLE | ACCOUNTANT — 206 |

FIG. 2B
← 220

| AVAILABLE NAVIGATIONS |
|---|
| DEPARTMENT MEMBERS |
| DEPARTMENT COMPANY ← 222 |
| DEPARTMENT DETAIL |
| DEPARTMENT MANAGER — 224 |

FIG. 2C  ← 230

| DEPARTMENT MANAGER |
|---|

| | |
|---|---|
| MANAGER NAME | MARY M. SMITH |
| DEPARTMENT NAME | ACCOUNTING |
| COMPANY | ACME SOFTWARE INC. |

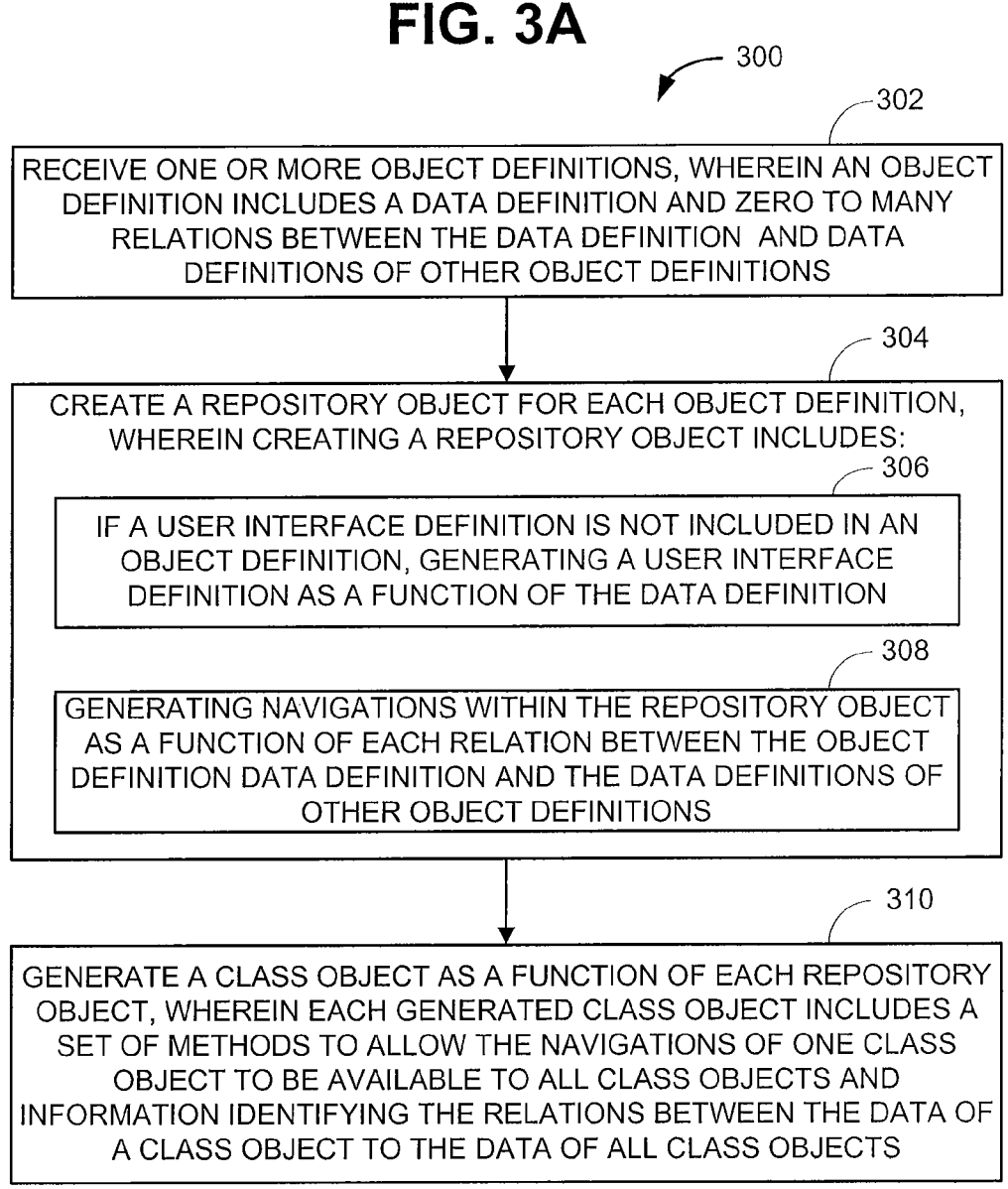

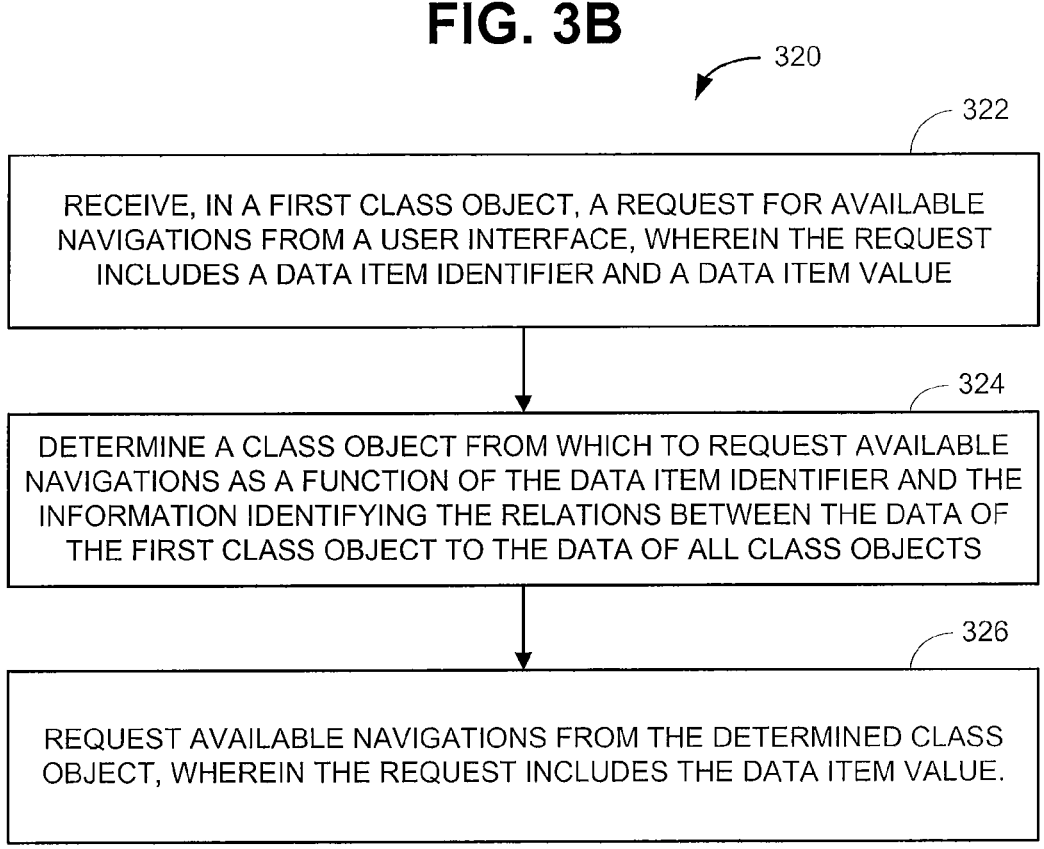

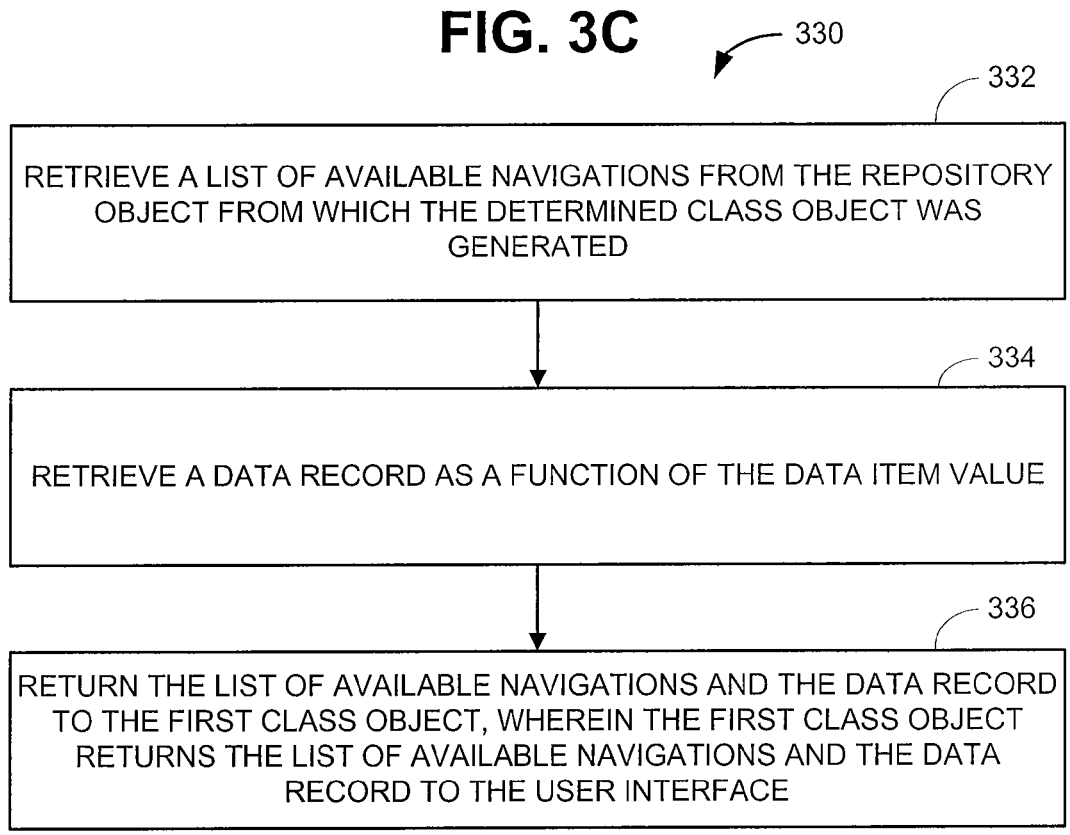

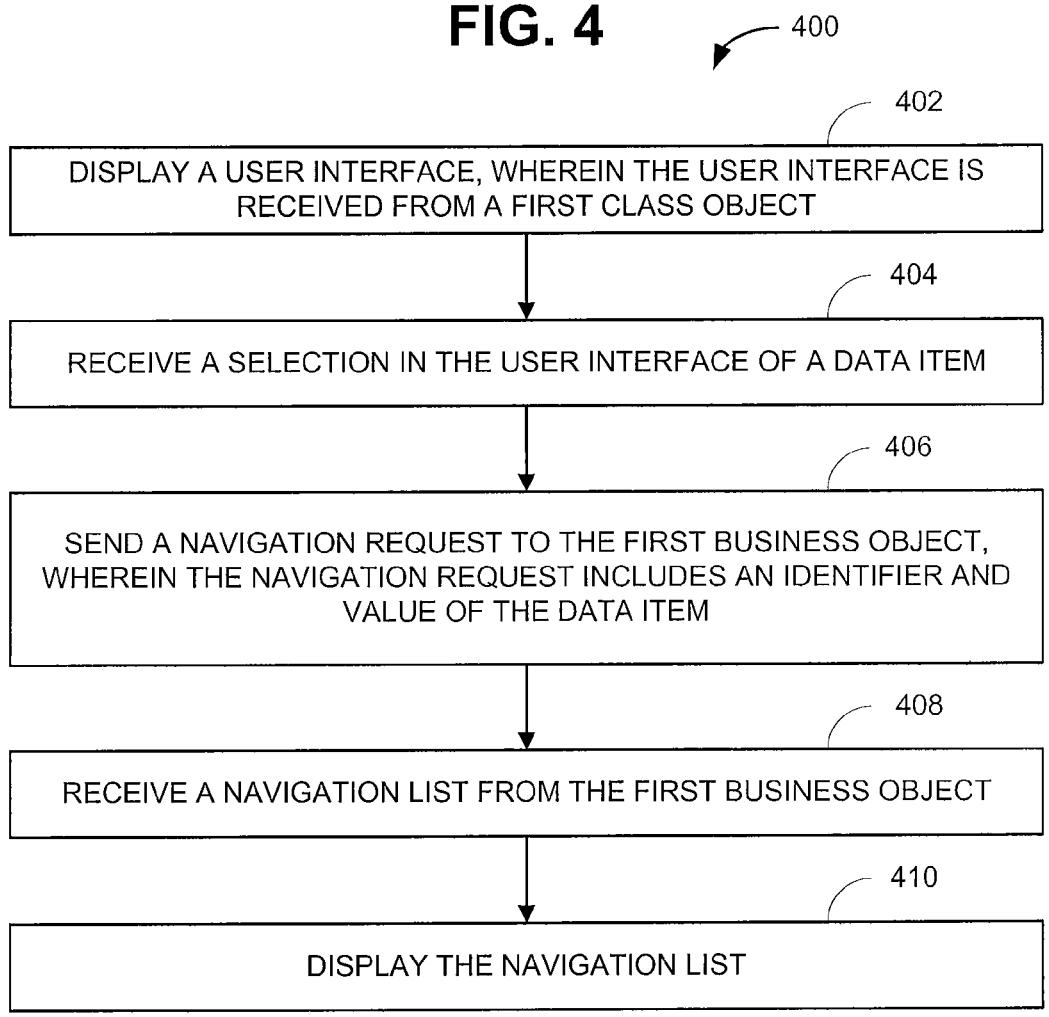

DATA ORIENTED NAVIGATION WITHIN SOFTWARE APPLICATIONS

TECHNICAL FIELD

The inventive subject mater relates to data processing and, more particularly, to data oriented navigation within software applications.

BACKGROUND INFORMATION

Navigation between user interfaces of software applications is performed by selecting menu options. These menu options are commonly static, regardless of what is displayed within a user interface. However, some software applications include navigation menu options that are specific to the user interface, but these efforts have been coded within the specific user interface definitions and do not allow for reuse of code between user interfaces.

SUMMARY

Various embodiments as described and illustrated herein provide data oriented navigation within software applications. Some such embodiments include navigations within objects that make the navigations available to other objects. Objects in such embodiments include a representation of a software application data model to determine an object that is responsible for maintaining data. Thus, when an object receives a navigation request based on an item of data, the object receiving the request determines which object is responsible for maintaining the item of data and routes the navigation request to the appropriate object. That object then provides a list of available navigations that are displayed for selection within a user interface. These embodiments, and others, are illustrated in the figures described in greater detail in the following detailed description.

BRIEF DESCRIPTION OF THE DRAWINGS

FIG. 2A is a user interface illustration according to an example embodiment.

FIG. 2B is a user interface illustration according to an example embodiment.

FIG. 2C is a user interface illustration according to an example embodiment.

FIG. 3A is a block diagram of a method according to an example embodiment.

FIG. 3B is a block diagram of a method according to an example embodiment.

FIG. 3C is a block diagram of a method according to an example embodiment.

FIG. 4 is a block diagram of a method according to an example embodiment.

DETAILED DESCRIPTION

Figure 1:
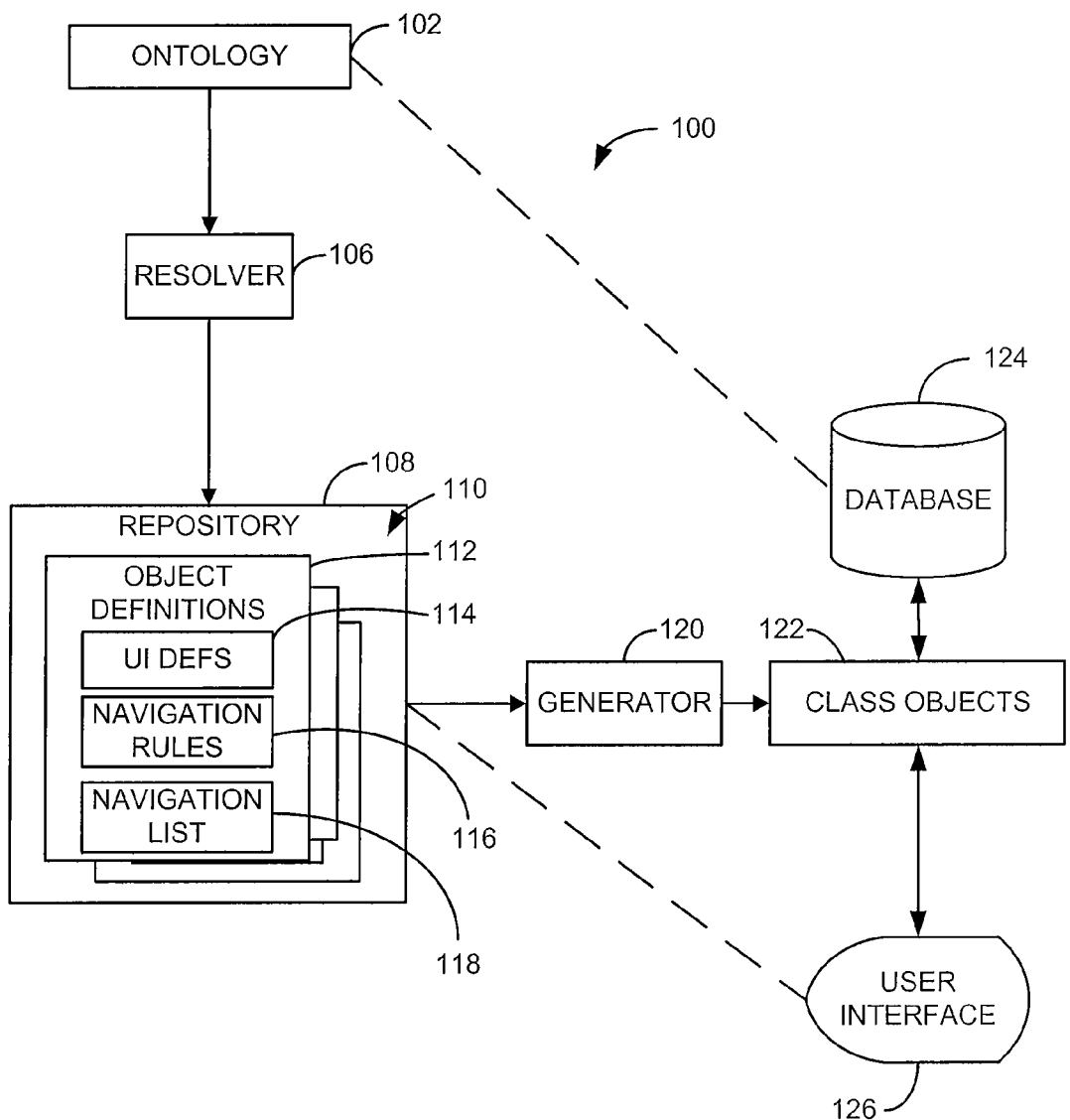
FIG. 1 is a schematic diagram of a system according to an example embodiment.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a schematic diagram of a system 100 according to an example embodiment. The example system 100 includes an ontology 102, a resolver 106, and a repository 108 including object definitions 110. The system 100 further includes a generator 120 to generate class objects 122 as a function of the object definitions 110, a database 124 and a user interface 126.

The ontology 102 is a repository of system 100 definitions. Within the ontology 102, the system 100 data model, objects, manually generated user interfaces, business rules, and other logic are defined. In some embodiments, the definitions are made in a pattern language. In some embodiments, the pattern language is a domain specific language (DSL) created or selected based on the particular domain or purpose of the system 100. An ontology data model, in some embodiment, is used to create or modify the structure of the database 124.

In an example embodiment, a system 100 developer can define portions of the system 100 within the ontology 102. For example, when the system 100 is a human resources system, the developer defines an employee record and a department record. The developer then defines business rules or constraints on data items within the records, some of which can be in the context of data items in other records. For example, a department data item identifying a department an employee belongs to is defined within the employee record by marking the employee record as being in the context of a department record. This employee record department data item can then be designated as a possible navigation, meaning that within the system 100, the employee record department data item can be used to navigate to a department record. In some embodiments, possible navigations can be defined as valid, meaning the navigation is available for use, or invalid, meaning the navigation is not available for use. In further embodiments, a navigation can include rules that evaluate one or more data values to determine if the navigation is valid when a list of available navigation is requested.

The system 100 developer can further define user interfaces including data selection criteria. However, in some embodiments, the developer need not define user interfaces because user interfaces can be automatically generated by the resolver 106 as a function of one or more of the record definitions, business rules and constraints, and other associated record definitions.

The content of the ontology 102 is then forwarded to the resolver 106 which creates object definitions 110 in the repository 108. In some embodiments, the resolver 106 creates an object definition for each record definition received from the ontology 102. In some embodiments, an object definition, such as object definition 112 includes a record definition, at least a portion of the data model identifying relations between data items of the record definition and data items of other record definitions, and business rules and constraints of the record. The object definition 112 further includes user interface definitions 114 defined by the user or automatically generated by the resolver 106. Further, the object definition 112 includes a navigation list 118 of available navigations within the object definition 112.

The navigation list 118 includes navigation records. A navigation record, in some embodiments, includes a navigation name, a user interface definition identifier from the user interface definitions 114, and one or more valid/invalid navigation determination rules, such as navigation rules 116. In some embodiments, the navigation rules 116 are defined separately and referenced by a navigation definition, such a navigation definitions within the navigation list 118. The user interface definition identifier designates a user interface definition to display in the user interface 126 when the navigation is selected within the user interface 126. One approach for defining navigation is shown in Appendix A.

In some embodiments, the resolver 106 further identifies possible navigations between record data items as a function of the data model. These possible navigations are added to the respective object definition navigation lists.

The object definitions 110 are then used by the generator 120 to create class objects 122. In some embodiments, a class object is generated for each object definition. In some such embodiments, a class object is generated as a function of only a portion of an object definition. For example, a class object is generated for the portions of the object definition that are determined to be static or unlikely to change. In such embodiments, the portions of the object definition that are more likely to change, be removed, or be added to, are accessed by other portions of the system 100, such as by the class objects 122 and the user interface 126, directly from the repository 108. Such embodiments provide greater flexibility and allow the system 100 to be more dynamic and adaptable to changing business requirements.

In some embodiments, the generator 120 causes at least a portion of the data model identifying relations between class object data items and data items of other class objects to be included in the class object. The class objects 122 further include standardized methods to provide a common interface between class objects, between the class objects 122 and the repository 108 object definitions 110, and between the class objects 122 and the user interface 126. In some embodiments, these method include methods to receive data access request and fulfill those requests with data from the database 124.

These standardized class object methods also include a method to receive a navigation request from the user interface 126. A navigation request includes an identifier of a data item to navigate from and a value of the data item. In some embodiments, the method to handle the navigation request determines a class object capable of handling the navigation request as a function of the data item identifier and the portion of the data model included in the class object receiving the navigation request. If the class object determined to be capable of handling the navigation request is other than the class object receiving the request, the class object receiving the navigation request forwards the navigation request to the determined class object by calling the navigation request method of the determined class object. The determined class object then services the navigation request and returns a navigation request back to the user interface 126 via the class object originally receiving the navigation request.

The class object capable of handling the navigation request retrieves the class object's navigation list from the class object's associated repository 108 object definition by calling a repository 108 object method. In some embodiments, the class object capable of handling the navigation request further retrieves a record from the database 124 as a function of the data item value received from the user interface 126 with the navigation request. The retrieved navigation list and the database 124 record are then returned to the requestor, whether that is the user interface 126 or another class object that forwarded the request to the determined class object. Returned with the navigation list and database 124 record is identifying information that ties the database 124 record to a class object. This information identifying ties to the database record 124 informs other parts of the system 100 that the database 124 record is an Employee record or Department record. In some embodiments, the ability for the data (database 124 record) to "know its source" (i.e., where the data came from) provides the ability to have the ability for the database 124 record to be updatable from anywhere within the system 100, regardless of the user interface within which the database 124 record is displayed.

In some embodiments, the generator 120 generates Java class objects, Enterprise Java Beans (EJBs), or other software code based objects depending on the particular embodiment and the environment in which the system 100 executes.

The user interface 126 after making a navigation request and receiving a navigation list in response thereto, causes the navigation list to be displayed. In some embodiments, the user interface 126 cause at least each valid navigation to be displayed. Selection of one of the navigations causes the user interface to call a method of the class object that serviced the navigation request from the user interface by sending a method call and the retrieved record to the class object. In some embodiments, this method call causes the user interface associated with the selected navigation to be displayed and populated with data received from the class object in response to the method call. In other embodiments, the user interface causes the user interface definition to be retrieved from the repository 108 and displayed in the user interface 126. In this embodiment, the user interface 126 is then populated with data received from the class object. FIG. 2A, FIG. 2B, and FIG. 2C illustrate example user interfaces and their descriptions below provide more detail on what is displayed within the user interface.

FIG. 2A is a user interface 200 illustration according to an example embodiment. The user interface 200 displays an example employee detail record maintained by an employee class object of a system, such as the system 100 of FIG. 1. The user interface displays record values including employee name 202, employee department 204, and employee title 206. A data model included within the employee object identifies a relationship between the employee department data item and a department class object. Thus, if a request is made by the user interface 200 for navigations available from the employee department 204 field, a navigation request is sent by the user interface to the employee class object. In some embodiments, to make a navigation request, a user can right click a mouse on the employee department 204 field and select a "Navigations" item from a popup menu. In other embodiments, navigations are displayed within a user interface to a user. One or more of the navigations can be selected. In some such embodiments, the user interface is displayed within a web browser and the navigations that can be selected are hyperlinks.

The navigation request, in some embodiments, includes an identifier of the employee department 204 field and the value of the employee department 204 field. The employee class object then determines, as a function of the portion of the data model included within the employee class object, that the navigations for the employee department 204 are available from the department class object. The employee class object forwards the navigation request to the department class object. The department class object retrieves a data record as a function of the value of the employee department 204 field, retrieves a navigation list from the repository, and returns the navigation list and the retrieved data record back to the user interface 200 via the employee class object.

The user interface 200 then causes the navigation list to be displayed within another user interface, such as user interface 220 of FIG. 2B. FIG. 2B is a user interface 220 illustration according to an example embodiment. The user interface 220 is a list of available navigations 222 from the employee department 204 field of the user interface 200 in FIG. 2A. Each of the list 222 members can be selected by a user, such as by clicking on the list 222 member. For example, if a user selects the department manager 224 list 222 member, a user interface associated with the department manager 224 navigation is displayed, such as the user interface 230 of FIG. 2C.

FIG. 2C is a user interface 230 illustration according to an example embodiment. The user interface 230 provides the requested department manager 224 navigation.

In some embodiments, the fields within user interfaces displaying data from class objects, such as the user interface 200 of FIG. 2A and the user interface 230 of FIG. 2C, are updateable. Upon changing data within such fields, the data can be updated in a database via the respective class object.

The department manager 224 navigation, or other available navigations in various embodiments, are available based on relations between data. For example, an employee record includes a department data item. Thus, a navigation is available from the department item data item to a department record based on a employee record one to one relationship between the department data item and the department record. However, further navigations can be available from the employee record department data item to other records having a relationship with the department record. For example, as illustrated in FIG. 2B and FIG. 2C, a department manager record can be navigated to based on the further one to one relationship between the department record and department manager record. Other navigations can be possible such as a department members navigation based on one to many relationship between the department record and employee records including a department data item equal to the department record key. Thus, many navigations are possible based on relations between data item values and the data model of a system. These relations can include one to one, one to many, zero to one, zero to many, and other possible relationships between data items within a data model.

FIG. 3A is a block diagram of a method 300 according to an example embodiment. The example method 300 includes receiving one or more object definitions, wherein an object definition includes a data definition and zero to many relations between the data definition and data definitions of other object definitions. The method 300 also includes creating a repository object for each object definition 304 and generating a class object as a function of each repository object 310. In some such embodiments, each generated class object includes a set of methods to allow the navigations of one class object to be available to all class objects and information identifying the relations between the data of a class object to the data of all class objects.

In some embodiments, creating a repository object for each object definition 304 includes determining if a user definition is included in an object definition, and if not, generating a user interface definition as a function of the data definition 306. Some embodiments of the method 300 also include generating navigations within the repository object as a function of each relation between the object definition data definition and the data definitions of other object definitions 308.

FIG. 3B is a block diagram of a method 320 according to an example embodiment. The example method 320 is an extension of the method 300 of FIG. 3A. Thus, the method 320 further includes receiving, in a first class object, a request for available navigations from a user interface, wherein the request includes a data item identifier and a data item value 322. The method 320 also includes determining a class object from which to request available navigations as a function of the data item identifier and the information identifying the relations between the data of the first class object to the data of all class objects 324. Further, the method 320 includes requesting available navigations from the determined class object, wherein the request includes the data item value 326.

FIG. 3C is a block diagram of a method 330 according to an example embodiment. The method 330 is a further extension of the method 320 of FIG. 3B. In example method 330 the determined class object upon receipt of the request for available navigations retrieves a list of available navigations from the repository object from which the determined class object was generated 332 and retrieves a data record as a function of the data item value 334. The determined class object then returns the list of available navigations and the data record to the first class object, wherein the first class object returns the list of available navigations and the data record to the user interface 336. In some embodiments, the availability of a navigation is determined by evaluating conditions listed in a navigations definition.

Some embodiments further include displaying the list of available navigations in a user interface. In such embodiments, selection of one of the available navigations causes a navigation request to be sent to the determined class object along with the data record and the determined class object causes the user interface to display data as a function of the selected navigation and the data record.

FIG. 4 is a block diagram of a method 400 according to an example embodiment. The example method 400 includes displaying a user interface, wherein the user interface is received from a first class object 402, and receiving a selection in the user interface of a data item 404. The method 400 further includes sending a navigation request to the first business object, wherein the navigation request includes an identifier and value of the data item 406, receiving a navigation list from the first business object 408, and displaying the navigation list 410. In some embodiments, the navigation list includes a list of one or more available navigations, a data record, and an identifier of an object to which a request for one of the available navigations is to be sent.

Some embodiments of the method 400 further include receiving a navigation selection in the displayed navigation list and forwarding the data record to the identified object to which the navigation request is to be sent and an identifier of the selected navigation. Yet further embodiments include displaying the selected navigation.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
   receiving one or more object definitions, wherein an object definition includes a data definition and zero to many relations between the data definition and data definitions of other object definitions;
   creating a repository object for each object definition, wherein creating a repository object includes:
      if a user interface definition is not included in an object definition, generating a user interface definition as a function of the data definition,
      generating navigations within the repository object as a function of each relation between the object definition data definition and the data definitions of other object definitions, and
      storing the generated navigations in a navigation list, the navigation list navigation records including identifiers of other user interface definitions and one or more navigation validity determination rules;
   generating a class object as a function of each repository object, wherein each generated class object includes a set of methods to allow the navigations of one class object to be available to all class objects and information identifying the relations between the data of a class object to the data of all class objects; and
   storing the generated class object.

2. The method of claim 1, further comprising:
   receiving, in a first class object, a request for available navigations from a user interface, wherein the request includes a data item identifier and a data item value;
   determining a class object from which to request available navigations as a function of the data item identifier and the information identifying the relations between the data of the first class object to the data of all class objects; and
   requesting available navigations from the determined class object, wherein the request includes the data item value.

3. The method of claim 2, wherein the determined class object upon receipt of the request for available navigations:
   retrieves a list of available navigations from the repository object from which the determined class object was generated;
   retrieves a data record as a function of the data item value; and
   returns the list of available navigations and the data record to the first class object, wherein the first class object returns the list of available navigations and the data record to the user interface.

4. The method of claim 3, further comprising:
   displaying the list of available navigations in a user interface, wherein:
      selection of one of the available navigations causes a navigation request to be sent to the determined class object along with the data record, and
      the determined class object causes the user interface to display data as a function of the selected navigation and the data record.

5. The method of claim 4, wherein the data the determined class object causes the user interface to display is one or more records from which the item value is relationally related.

6. The method of claim 4, wherein the data the determined class object causes the user interface to display is updateable.

7. The method of claim 2, wherein the first class object and the determined class object are the same object.

8. The method of claim 3, wherein the first class object and the determined class object are the same object.

9. The method of claim 4, wherein the first class object and the determined class object are the same object.

10. The method of claim 5, wherein the first class object and the determined class object are the same object.

11. A system comprising:
    a processor;
    a memory coupled to the processor and storing instructions executable by the processor to:
    maintain a repository including one or more repository objects, wherein a repository object includes one or more user interface definitions and a navigation list; and
    maintain one or more class objects, each class object associated with a dataset for which it is responsible and associated with one of the repository objects, wherein a class object includes:
       information identifying relations between the dataset associated with the class object and datasets associated with other class objects; and
       a navigation list method operable on the processor to:
          receive a navigation request from a requestor including a data item identifier and data item value,
          retrieve the navigation list from the associated repository object associated with the class object and provide the navigation list the requestor, and
          wherein the navigation list identifies navigations within the repository object and a user interface associated with each navigation and a validity indicator associated with each navigation that limit which navigations may be displayed.

12. The system of claim 11, wherein the navigation list method is further operable on the processor to:
    determine a class object capable of handling the navigation request as a function of the data item identifier and the information identifying relations between the dataset associated with the class object and datasets associated with other class objects, and
    forward the navigation request to the determined class if other than the class object.

13. The system of claim 11, wherein the navigation list method is further operable on the processor to:
- retrieve a record from the class object's associated dataset as a function of the data item value; and
- provide the retrieved record to the requestor with the navigation list.

14. A computer readable storage media, with instructions thereon, which when executed by a machine, cause the machine to:
- receive one or more object definitions, wherein an object definition includes a data definition and zero to many relations between the data definition and data definitions of other object definitions;
- create a repository object for each object definition, wherein creating a repository object includes:
  - if a user interface definition is not included in an object definition, generating a user interface definition as a function of the data definition,
  - generating navigations within the repository object as a function of each relation between the object definition data definition and the data definitions of other object definitions, and
  - storing the generated navigations in a navigation list, the navigation list navigation records including identifiers of other user interface definitions and one or more navigation validity determination rules; and
- generate a class object as a function of each repository object, wherein each generated class object includes a set of methods to allow the navigations of one class object to be available to all class objects and information identifying the relations between the data of a class object to the data of all class objects.

15. The computer readable storage media of claim 14, wherein the instructions, which when further executed, cause the machine to:
- receive, in a first class object, a request for available navigations from a user interface, wherein the request includes a data item identifier and a data item value;
- determine a class object from which to request available navigations as a function of the data item identifier and the information identifying the relations between the data of the first class object to the data of all class objects; and
- request available navigations from the determined class object, wherein the request includes the data item value.

16. The computer readable storage media of claim 15, wherein the determined class object upon receipt of the request for available navigations:
- retrieves a list of available navigations from the repository object from which the determined class object was generated;
- retrieves a data record as a function of the data item value; and
- returns the list of available navigations and the data record to the first class object, wherein the first class object returns the list of available navigations and the data record to the user interface.

17. The computer readable storage media of claim 16, wherein the instructions, which when further executed, cause the machine to:
- display the list of available navigations in a user interface, wherein:
  - selection of one of the available navigations causes a navigation request to be sent to the determined class object along with the data record, and
  - the determined class object causes the user interface to display data as a function of the selected navigation and the data record.

18. The computer readable storage media of claim 17, wherein the data the determined class object causes the user interface to display one or more records from which the item value is relationally related.

* * * * *